United States Patent Office
3,782,926
Patented Jan. 1, 1974

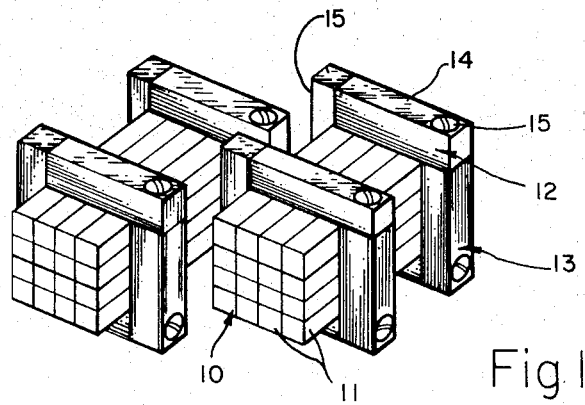

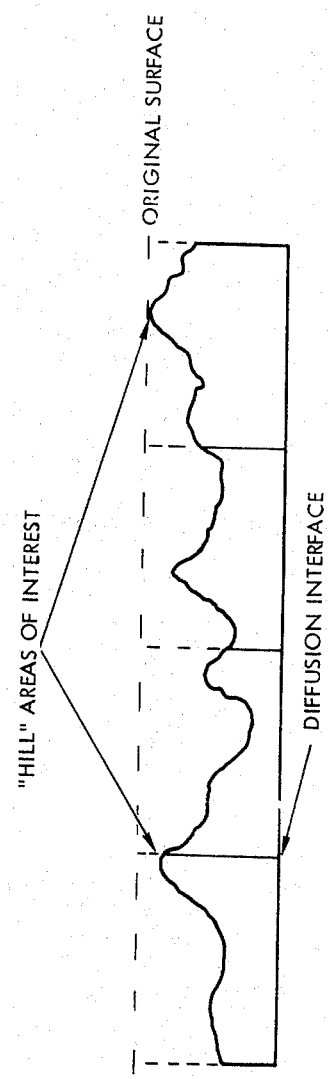

3,782,926
METHOD FOR PRODUCING AND EVALUATING ALLOYS
Milton E. Kirkpatrick, Palos Verdes Peninsula, and Ralph A. Mendelson, Westminster, Calif., assignors to TRW Inc., Redondo Beach, Calif.
Continuation-in-part of abandoned application Ser. No. 5,042, Jan. 22, 1970. This application Feb. 3, 1971, Ser. No. 112,151
Int. Cl. C22c 1/00, 33/00
U.S. Cl. 75—129                4 Claims

ABSTRACT OF THE DISCLOSURE

Corrosion resistant alloys are produced by forming blocks of the individual metals, clamping the blocks together and heating them in a furnace, thereby causing the metals at the surface of the blocks to slowly diffuse into each other. This diffusion will take place along an interface and will produce binary or multiple component alloys in all possible concentrations. The metal block is allowed to cool and then subjected to treatment in a test corrosion medium. The block is then viewed under an electron microscope and corrosion resistant areas are analyzed by X-ray or electron microprobe to determine the concentration of the metal components in the corrosion resistant area. Compositions corresponding to the analysis will have about the same corrosion resistance in the test environment to which the block was subjected.

BACKGROUND OF THE INVENTION

This application is a continuation-in-part of application Ser. No. 5,042 filed Jan. 22, 1970, now abandoned.

The invention herein described was made in the course of a contract with the Department of Defense.

This invention relates to a new and improved process and apparatus for determining the corrosion resistance of metal alloys. More specifically, this invention relates to a method and apparatus for forming a wide range of alloys under controlled diffusion conditions, and their subsequent analysis by electron microprobe, X-ray or metallographic techniques following exposure to a particular corrosion environment.

The formulation and evaluation of metal alloys suitable for use in specific corrosion environment conditions is a tedious operation. It involves the weighing out of metal samples of over a wide concentration range followed by their fusion and then testing in one or more corrosion environments. Binary compositions are the easiest to evaluate since there are only the two components to be fused together. The only limiting factor is the number of components which can be prepared and tested in a reasonable period of time. However, if ternary or higher alloy compositions are to be evaluated, the method used for preparing binary compounds is wholly inadequate since there are too many possible compounds which can be tested. Consequently, the usual technique for evaluating multicomponent alloys is to prepare samples and vary the concentrations of each component, or of a single component, over a fairly wide concentration interval such as 5 or 10%. The samples are then individually tested in the desired corrosion medium and their corrosion resistance may be plotted on curves, or subjected to statistical analysis to obtain the desired compositions. Not only is this technique time consuming but it does not produce compositions with a continuous range of concentrations. Hence, there is always the possibility that a specific concentration of metals will be missed that could produce an alloy markedly more corrosion resistant than would be indicated by a series of corrosion curves. Even if a method were found which could provide a continuous range of components for a particular alloy, the corrosion testing of such a large number of compounds using present techniques would be overwhelming.

It is, therefore, an object of the invention to provide a process for producing binary and multiple component alloys at all concentrations.

It is a further object of this invention to provide a method for testing these compositions by an analytical technique which permits a continuous range of alloys to be tested simultaneously and rapidly.

It is a further object of the invention to provide an apparatus from which multiple alloys can be formed, subjected to a corrosion environment, and then be rapidly analyzed.

It is a further object of the invention to provide new and improved alloys which exhibit corrosion resistance to concentrated phosphoric acid at high temperatures.

Other objects of the invention will become apparent from the description to follow.

According to the invention, the process for providing and testing a continuous range of alloys comprises the steps of forming a diffusion zone between an array of test metals, subjecting the diffusion zone to a corrosion environment to thereby corrode the diffusion zone, and analyzing those areas in the diffusion zone which exhibit corrosion resistance.

The invention will be more clearly illustrated in the diagrams in which:

FIG. 1 is a perspective view showing an array of metal blocks prior to being subjected to a diffusion forming operation;

FIG. 2(a–c) are schematic diagrams showing the stacking arrangements of various metal blocks;

FIG. 3 is a schematic drawing showing a cross-sectional view of an array of diffusion blocks following exposure to a corrosive medium.

An array of blocks 10 are shown in FIG. 1 prior to diffusion and comprises a 4 x 4 array of individual blocks 11 (about 0.12" edge length) held together by clamps 12 and 13. These are low thermal expansion clamps which must be employed to hold the diffusion blocks securely together at the high temperatures employed in the diffusion zone in order to produce a composition gradient. The clamps comprise horizontal and vertical bars 14 preferably composed of molybdenum; the bars are held together by tantalum screws 15. The array of FIG 2(c) was secured tightly by the same molybdenum clamp of FIG. 1; this provided a molybdenum source for the diffusion zone.

In a square array, as in FIG. 1, the edge between two blocks will define a binary diffusion zone when the array of FIG. 2(c) was secured tightly by the same molyb-blocks will define a quaternary diffusion zone. Obviously, multiple diffusion zones in excess of four could be produced by simply varying the shape of the individual blocks.

Almost any variation of the constituents of the block array can be made provided that the lowest temperature at which a given block will fuse should not be greatly different from the temperature at which the highest melting point block will melt, otherwise the low melting point block will tend to spread over too large a section of the array.

After a block array has been prepared, it is then subjected to a heating operation to produce the diffusion zones between each of the individual blocks. This comprises placing the array in a furnace in a vacuum (less than $10^{-4}$ torr) for various periods of time at a sufficiently high temperature until the desired degree of diffusion has taken place. The extent of diffusion of the metals may be determined by Fick's first and second laws which relate the functions of time, temperature, and the diffusion distance. Thus, the alloy compositions in the various diffusion zones can be altered by halting the elevated temperature diffusion process, and then by cutting a cross-sectional slice from the block. Diffusion should be allowed to take place for sufficient time to permit mass transfer across the material interfaces and cause a wide range of alloy compositions to form. If desired, the entire block can then be returned to the furnace for further diffusion.

Following the diffusion treatment, a cross-sectional slice of the array is exposed to a corrosive medium of interest thus causing a corrosion topograph on the various diffusion zones.

FIG. 3 shows regions which are more highly resistant to corrosion than others. These regions are readily discernible when viewed under a microscope and appear as hills. Analysis of these hills by X-ray, electron microprobe, or other metallurgical techniques will reveal the composition of these corrosion resistant areas, as shown in the following Table 1.

TABLE 1.—DIFFUSION BLOCKS FOR PHOSPHORIC ACID CORROSION TEST

| Block | Components | Diffusion conditions Temperature, °C. | Time, hrs. | Corrosion-resistant areas [1,2] |
|---|---|---|---|---|
| A | Co, Cr, Fe, Mo, Ni, W. | 1,200 | 300 | 48 Fe-Mo<br>62 Mo-Ni |
| B | Cr, Mo, Nb, Ta, V, W. | 1,600 | 300 | 1.8 Cr-6, Nb-78, Ta-13.7 V<br>4.6 Cr-60.5, Ta-34.9 V |
| C | Mo, Nb, Ti, V, W. | [3] 1,500<br>1,200 | 100<br>100 | 67.4 Mo-32.6 Ti<br>0.5 Mo-7.95 Ti-91.5 W<br>6.8 Mo-29.3 Nb-52.3 Ti-11.6 V |

[1] Blocks A and B exposed to 98% phosphoric acid at 200° C.; Block C to 95% phosphoric acid at 165° C.
[2] Compositions in w/o.
[3] Temprature lowered after initial 100 hrs. due to vaporization of titanium.

Table 1 shows various compositions in blocks A, B and C, produced in the three diffusion zones of FIG. 2(a–c) respectively, which exhibited corrosion resistance to phosphoric acid at two different concentrations of phosphoric acid at two different temperatures. It will be quite apparent that producing the four component compound: molybdenum-niobium-titanium-vanadium of FIG. 2(c) would normally require a tremendous amount of time and effort to arrive at a suitable composition valid to three decimal places. This also applies to the four component composition of chromium-niobium-tantalum-vanadium of FIG. 2(b).

Obviously, if a further refinement in the composition of a corrosion resistant material is desired, an array of blocks can be formed in which each of the individual blocks comprises an alloy having the approximate composition of the corrosion resistant material in question. The diffusion zone which is produced will thus contain the alloy components in amounts approximating the original desired composition, but varying over a much narrower range. Hence, the second array will produce many more alloy compositions in the critical area, which can lead to more precise formulations than if only one array is employed.

In another application by using this technique as a starting point, a binary nickel-molybdenum alloy was found which, by applying routine metallurgical techniques and theory, obtained a second alloy that exhibited substantial corrosion resistance in the environment of hot concentrated phosphoric acids. This result is somewhat surprising because nickel has an extremely high corrosion rate in such an environment and, therefore, would not normally be selected as a base element in alloy development program for phosphoric acid environments; this is shown in the following Table 2.

TABLE 2

Corrosion resistance of Mo-Ni alloy

| Composition, w/o | Weight-loss ($\nabla w$), g. | Time (t), hrs. | Corrosion rate (mills per year) |
|---|---|---|---|
| 100 Ni | 0.6493 | 3.0 | 27,966 |
| 37 Mo-Ni | 0.0007 | 8.2 | 5.3 |
| 35 Mo-Ni | 0.0017 | 8.2 | 13.3 |
| 30 Mo-Ni | 0.0002 | 4.5 | 3.30 |
| 30 Mo-Ni | [1] 0.0007 | 50.5 | 0.85 |
| 25 Mo-Ni [2] | ([3]) | 4.5 | |
| 20 Mo-Ni [4] | 0.0293 | 4.5 | 490 |
| 20 Mo-Ni [5] | 0.0777 | 4.4 | 1,415 |
| 20 Mo-Ni [4] | 0.0273 | 4.4 | 495 |

[1] Long test period.
[2] Inhomogeneous=contained voids and secondary phase.
[3] Undetectable for duration of test.
[4] As rolled.
[5] Annealed.

NOTE.—Rate=3.45×10⁶ ($\nabla w/\rho t$), where $\rho$ is the density.

Table 2 shows an alloy containing from about 25 to 30% of molybdenum in nickel that exhibits a negligible or only minor corrosion weight loss; furthermore, this range of nickel-molybdenum alloys are quite ductile and can be rolled from the "as-cast" billet to sheet form at room temperature. The molybdenum-nickel alloy can replace tantalum in applications requiring exposure to boiling concentrated phosphoric acid at 200° C. The corrosion of the molybdenum-nickel alloy is nearly equivalent to that of tantalum, the latter costing approximately $50 per pound.

In still another instance, using the technique of the present invention, about a 27% Ta-73% Ti alloy produced by diffusion at 900° C. for 300 hours exhibited corrosion resistance to 95% phosphoric acid at 165° C.

In still another instance, using the technique of the present invention a 23 Mo-30 Nb-35 Ti-12 V arc-cast alloy button was exposed in 95% phosphoric acid at 165° C. for 96 hours; the weight loss rate was about 0.7 mg. hr.⁻¹.

Similarly, an 18 Mo-30 Nb-40 Ti-12 V arc-cast alloy button underwent a weight loss rate of about 3 mg. hr.⁻¹, under the same conditions.

While the various alloys shown in Tables 1 and 2 were subjected to corrosive effects of phosphoric acids, it is quite obvious that other corrosion media and environments may be employed, such as gases or erosion by the impingement of fluids, etc.

The sensitivity of the determination of corrosion resistance is greatly increased by employing interferometry techniques to determine microcontours across the alloy block surface. This permits the high points or hills along a contour to be determined and analyzed, and provides a better indication of the desired range in concentration of the corrosion resistant materials and the composition.

In summary, the use of the present invention greatly increases the ability to rapidly and economically survey a wide variety of alloy systems and results in new alloy compositions, which exhibit very high corrosion resistance in the corrosion medium of interest. The present invention can be employed with equal ease to investigations of liquid or vapor environments; it can also pinpoint composition regions within simple and extremely complex alloy systems for further study.

What is claimed is:

1. A method for producing and analyzing corrosion resistant alloys which comprises:
   forming an array of metal blocks;
   maintaining the blocks securely together with low thermal expansion clamps to produce a composition gradient when heated;
   forming diffusion zones between the blocks by heating;
   exposing the diffusion zones to a corrosive environment; and
   analyzing the zones which exhibit corrosion resistance.

2. A method for producing an analyzing corrosion resistant alloys which comprises:
   forming an array of metal blocks;
   maintaining the blocks securely together with low thermal expansion clamps to produce a composition gradient when heated;
   forming diffusion zones between the block ends based on Fick's first and second laws of diffusion by heating;
   exposing the diffusion zones to a corrosive environment; and
   analyzing by electron microprobe or X-ray those zones which exhibit corrosion resistance.

3. The method of claim 1 in which the thermal expansion clamps are molybdenum.

4. A method for producing and analyzing corrosion resistant alloys which comprises:
   forming an array of metal blocks;
   maintaining the blocks securely together with low thermal expansion clamps to produce a composition gradient when heated;
   forming diffusion zones between the blocks based on Fick's first and second laws of diffusion by heating;
   exposing the diffusion zones to a corrosive environment; and
   analyzing the zones which exhibit corrosion resistance.

References Cited
UNITED STATES PATENTS

| | | | |
|---|---|---|---|
| 3,140,172 | 7/1964 | Coad | 75—135 |
| 3,113,376 | 12/1963 | Pflumm et al. | 29—194 |

RICHARD O. DEAN, Primary Examiner

U.S. Cl. X.R.

75—130.5, 135